United States Patent
Singla et al.

(10) Patent No.: US 9,531,755 B2
(45) Date of Patent: Dec. 27, 2016

(54) FIELD SELECTION FOR PATTERN DISCOVERY

(75) Inventors: Anurag Singla, Cupertino, CA (US); Zhipeng Zhao, Sunnyvale, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 14/398,003

(22) PCT Filed: May 30, 2012

(86) PCT No.: PCT/US2012/040019
§ 371 (c)(1),
(2), (4) Date: Oct. 30, 2014

(87) PCT Pub. No.: WO2013/180707
PCT Pub. Date: Dec. 5, 2013

(65) Prior Publication Data
US 2015/0135263 A1    May 14, 2015

(51) Int. Cl.
*G06F 17/30* (2006.01)
*H04L 29/06* (2006.01)
*G06F 21/55* (2013.01)

(52) U.S. Cl.
CPC ......... *H04L 63/20* (2013.01); *G06F 17/30595* (2013.01); *G06F 21/552* (2013.01); *H04L 63/1416* (2013.01); *H04L 63/1425* (2013.01)

(58) Field of Classification Search
CPC .......................... H04L 63/20; G06F 17/30595
USPC .......................................... 726/1, 23; 706/45
See application file for complete search history.

(56) References Cited

U.S. PATENT DOCUMENTS

| | | | |
|---|---|---|---|
| 5,809,499 A * | 9/1998 | Wong | G06F 17/30539 178/18.01 |
| 7,944,468 B2 | 5/2011 | Hoffman et al. | |
| 7,945,572 B2 | 5/2011 | Lapin et al. | |
| 8,073,729 B2 | 12/2011 | Kisin et al. | |
| 8,099,782 B1 | 1/2012 | Dash et al. | |
| 2002/0133721 A1 | 9/2002 | Adjaoute | |
| 2005/0131914 A1* | 6/2005 | Abdo | G06F 17/30536 |
| 2005/0235356 A1* | 10/2005 | Wang | G06F 17/30551 726/22 |
| 2007/0043697 A1* | 2/2007 | Driesch, Jr. | G06F 17/30469 |

(Continued)

FOREIGN PATENT DOCUMENTS

| | | |
|---|---|---|
| CN | 101976233 | 2/2011 |
| EP | 1490769 | 12/2004 |

(Continued)

OTHER PUBLICATIONS

Liu, "Learnable high-order MGRF models for contrast-invariant texture recognition", Feb. 2016, Computer Vision and Image Understanding, p. 135-146.*

(Continued)

*Primary Examiner* — Morshed Mehedi
*Assistant Examiner* — Gregory Lane
(74) *Attorney, Agent, or Firm* — Mannava & Kang, P.C.

(57) ABSTRACT

Fields are determined for pattern discovery in event data. Cardinality and repetitiveness statistics are determined for fields of event data. A set of the fields are selected based on the cardinality and repetitiveness for the fields. The fields may be included in a pattern discovery profile.

14 Claims, 5 Drawing Sheets

(56) References Cited

U.S. PATENT DOCUMENTS

| | | | |
|---|---|---|---|
| 2007/0061611 A1* | 3/2007 | Mackinlay | G06F 17/30554 |
| | | | 714/5.1 |
| 2008/0104046 A1* | 5/2008 | Singla | G06F 17/30333 |
| 2009/0064333 A1* | 3/2009 | Saurabh | H04L 63/1416 |
| | | | 726/23 |
| 2009/0144278 A1 | 6/2009 | Gunther et al. | |
| 2009/0323730 A1 | 12/2009 | Caltagirone et al. | |
| 2011/0107296 A1 | 5/2011 | Schneider | |
| 2014/0310260 A1* | 10/2014 | Wu | G06F 17/30442 |
| | | | 707/718 |
| 2015/0213246 A1* | 7/2015 | Turgeman | G06F 21/32 |
| | | | 726/23 |

FOREIGN PATENT DOCUMENTS

| | | |
|---|---|---|
| EP | 1490769 A1 | 12/2004 |
| JP | 2007249835 | 9/2007 |

OTHER PUBLICATIONS

International Search Report and Written Opinion received in PCT Application No. PCT/US2012/040019, mailed Feb. 18, 2013, 11 pages.

Supplementary European Search Report, Dec. 1, 2015, European Patent Application No. 12877804.0, 5 pages.

* cited by examiner

FIELD SELECTION FOR PATTERN DISCOVERY

BACKGROUND

Pattern detection generally aims to find previously unknown patterns in an input dataset. A pattern is an association of elements of the dataset that repeat throughout the duration of an examination time period. This is opposed to pattern matching methodologies, which look for matches in the input with pre-existing patterns, for example, using regular expressions.

Pattern detection methodologies may require a significant amount of resources and extensive knowledge of a domain related to the dataset to select appropriate information associated with the dataset for pattern matching.

BRIEF DESCRIPTION OF THE DRAWINGS

The embodiments may be better understood and their features made apparent by referencing the accompanying drawings. The drawings illustrate examples of the embodiments described herein.

DETAILED DESCRIPTION

Security information/event management (SIM or SIEM) for networks may include collecting data from networks and network devices that reflects network activity and/or operation of the devices and analyzing the data to enhance security. Examples of network devices may include firewalls, intrusion detection systems, servers, workstations, personal computers, etc. The data can be analyzed to detect patterns, which may be indicative of an attack or anomaly on the network or a network device. The detected patterns may be used, for example, to locate those patterns in the data. For example, the patterns may be indicative of activities of a worm or another type of computer virus trying to gain access to a computer in the network and install malicious software.

The data that is collected from networks and network devices is for events. An event may be any activity that can be monitored and analyzed. Data captured for an event is referred to as event data. The analysis of captured event data may be performed to determine if the event is associated with a threat or some other condition. Examples of activities associated with events may include logins, logouts, sending data over a network, sending emails, accessing applications, reading or writing data, port scanning, installing software, etc. Event data may be collected from messages, log file entries, which is generated by a network device, or from other sources. Security systems may also generate event data, such as correlation events and audit events. In some instances, one thousand events per second may be generated. This can amount to 100 million events per day or three billion events per month.

Events in event data may have a multitude of attributes. The event data may be stored according to fields associated with the attributes of the events in the event data. A field, for example, is an attribute describing an event in the event data. Examples of fields include date/time of event, event name, event category, event ID, source address, source MAC address, destination address, destination MAC address, user ID, user privileges, device customer string, etc. The event data may be stored in a table comprised of the fields. According to an embodiment, fields for events are selected for pattern discovery. The selected fields are a set of the fields in the table. The number of fields in the set may include two or more fields. The fields selected for the set are identified based on various statistics and are stored in a pattern discovery profile. A pattern discovery profile is any data used to discover patterns in event data. The pattern discovery profile may include the set of fields, parameters and other information for pattern discovery.

The automated selection of fields for pattern detection helps users that may have limited domain knowledge and expertise to select fields for building a pattern discovery profile. In cases where there are hundreds of event fields, it may be especially difficult for a user to select fields to identify patterns that may be relevant to detecting network attacks, insider threats, fraudulent behavior and other forms of suspicious or malicious activity. Furthermore, the user may not have the time or expertise to further fine tune selected fields by analyzing pattern discovery results.

A pattern is a sequence of a plurality of different activities. In an example of a pattern, the sequence of activities includes scan ports, identify open port, send packet with particular payload to the port, login to the computer system and store a program in a particular location on the computer system.

Also, patterns that are repeated are identified. For example, if a plurality of different activities is repeated, it may be considered a repetitive pattern. Also, a pattern may be between two computer systems. So the pattern can include a source field and a target field associated with the different computer systems. In one example, the source and target fields are Internet protocol (IP) addresses of the computer systems. The source and target fields describe the transaction between computer systems. Pattern activity may also be grouped together by other fields in addition or in lieu of one of the source and target fields. In one example, the pattern activity may be analyzed across User IDs to identify the sequence or collection of activity repeated by multiple users. In another example, the pattern activity may be analyzed across Credit Card Numbers or Customers to identify the sequence or collection of activity across multiple credit card accounts.

Other event fields, in addition or in lieu of one of the source and target fields may be included in a pattern discovery profile. In one example, a field is used to identify a specific pattern and is referred to as a pattern identification field. In one example, the pattern identification field is event name or event category. In another example, it can be the credit card transaction amount. In yet another example, it can be an Event Request URL field to detect application URL access patterns.

In addition to fields, parameters are selected for pattern discovery and may be included in the pattern discovery profile. One parameter is a number of activities, which represents the minimum number of different activities that need to be repeated for the activities to be considered a pattern. Another parameter is a repeatability parameter which indicates a minimum number of times the different activities are repeated. In one example, repeatability is associated with two fields. For example, repeatability may be represented as different combinations of source and target fields. A minimum number of different combinations of source and target IP addresses is an example of a repeatability parameter. These parameters may be adjusted until a predetermined amount of matching patterns is identified.

Once pattern discovery profiles are created, the profiles may be used to analyze incoming event data to detect patterns. If a pattern is detected, for example which represents a malicious attack on network security, then notifications, alerts or other actions may be performed to stop the attack.

Figure 1:
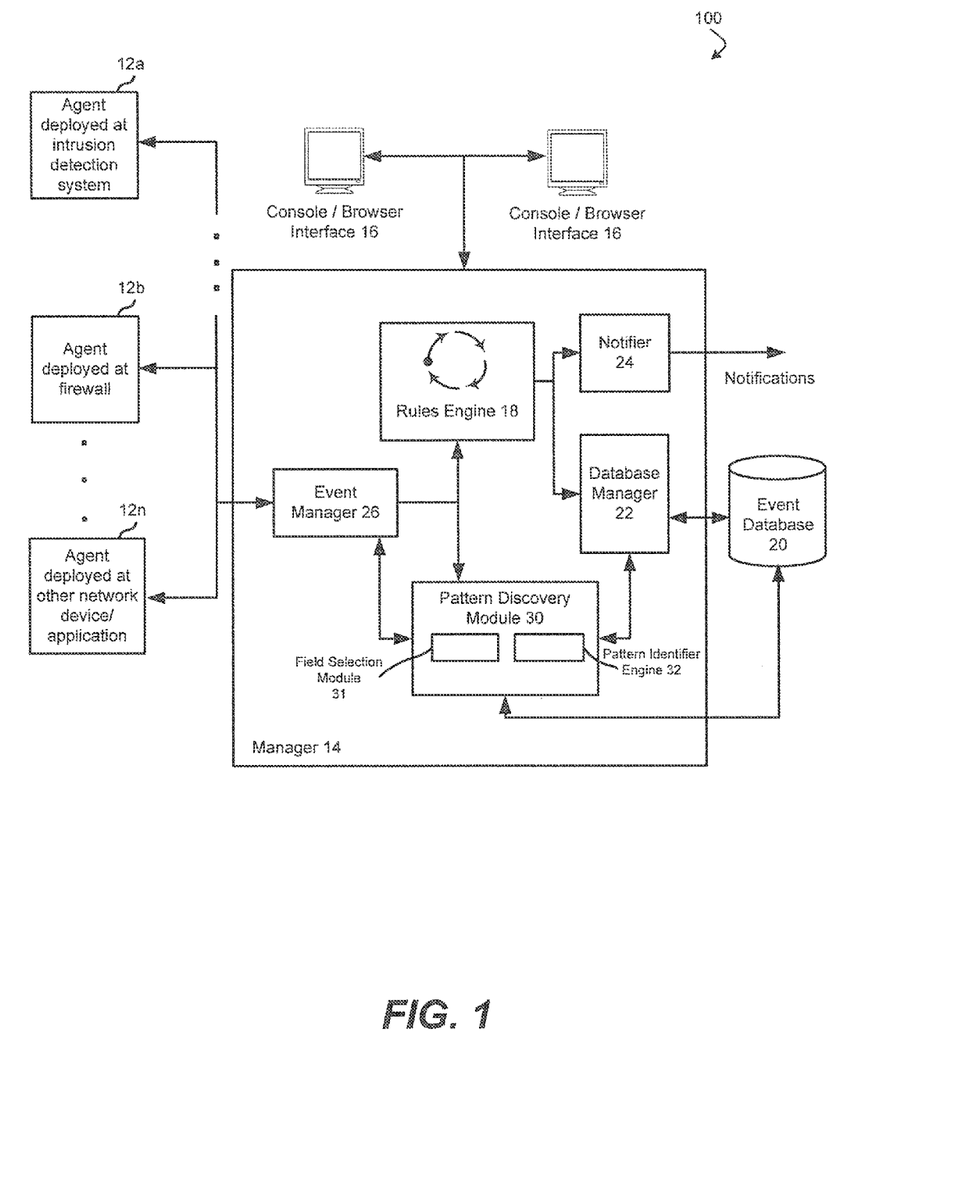
FIG. 1 shows a network security system.

FIG. 1 is a block diagram of a network security system 100 in accordance with an embodiment. System 100 includes agents 12a-n, a manager 14 and a console 16, which may include browser-based versions. In some embodiments, agents, managers and/or consoles may be combined in a single platform or distributed in two, three or more platforms (such as in the illustrated example). The use of this multi-tier architecture supports scalability as a computer network or system grows.

Agents 12a-n comprise machine readable instructions that provide efficient, real-time (or near real-time) local event data capture and filtering from a variety of network security devices and/or applications. The typical sources of security events are common network security devices, such as firewalls, intrusion detection systems and operating system logs. Agents 12a-n collect events from any source that produces event logs or messages and can operate at the native device, at consolidation points within the network, and/or through simple network management protocol (SNMP) traps.

Agents 12a-n are configurable through both manual and automated processes and via associated configuration files. Each agent 12 may include a normalizing component, a time correction component, an aggregation component, a batching component, a resolver component, a transport component, and/or additional components. These components may be activated and/or deactivated through appropriate commands in the configuration file.

Manager 14 may be comprised of server-based components that further consolidate, filter and cross-correlate events received from the agents, employing a rules engine 18 and a centralized event database 20 which may include an event table comprised of fields storing event data for received events. The database 20 may also store pattern discovery profiles generated by the manager 14. One role of manager 14 is to capture and store all of the real-time and historic event data to construct (via database manager 22) a complete, picture of security activity. The manager 14 also provides centralized administration, notification (through at least one notifier 24), and reporting, and case management workflow. The manager 14 may be deployed on any computer hardware platform and may use a database management system to implement the event data store component. Communications between manager 14 and agents 12a-n may be bi-directional (e.g., to allow manager 14 to transmit commands to the platform hosting agents 12a-n) and encrypted. Manager 14 may act as concentrators for multiple agents 12a-n and can forward information to other managers, e.g., deployed at corporate headquarters.

Manager 14 also includes event manager 26, which receives the event data messages transmitted by agents 12a-n. Event manager 26 is also responsible for generating event data messages such as correlation events and audit events. Where bi-directional communication with agents 12a-n is implemented, event manager 26 may be used to transmit messages to agents 12a-n. If encryption is employed for agent-manager communications, event manager 26 is responsible for decrypting the messages received from agents 12a-n and encrypting any messages transmitted to agents 12a-n.

Consoles 16 are applications that allow security professionals to perform day-to-day administrative and operation tasks such as event monitoring, rules authoring, incident investigation and reporting. Access control lists allow multiple security professionals to use the same system and event/trend database, with each having their own views, correlation rules, alerts, reports and knowledge base appropriate to their responsibilities. A single manager 14 can support multiple consoles 16.

Consoles 16 may be browser-based, and may be used to provide access to security events, knowledge base articles, reports, notifications and cases. The manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture, a centralized or decentralized environment may be supported. This is useful because an organization may want to implement a single instance of system 100 and use an access control list to partition users. Alternatively, the organization may choose to deploy separate systems 100 for each of a number of groups and consolidate the results at a "master" level.

The network security system 100 also includes pattern processing capabilities. The manager 14 includes a pattern discovery module 30. The pattern discovery module 30 receives a set of events, such as events from at least one of agents 12a-n via event manager 26, from event database 20 via the database manager 22, or from event manager 26.

In operation, agents 12a-n may provide events and/or aggregated data. In one example, agents 12a-n provide events, which are received in an event stream by event manager 26 and passed to rules engine 18 and pattern discovery module 30 for processing. An event stream is a continuous flow of events. Event data received from agents 12a-n or generated by manager 14 may be stored in an event table of database 20 via database manager 22.

The pattern discovery module 30 generates pattern discovery profiles which may be stored in the event database 20. The methods 300 and 400 describe examples of identifying fields which may be used for pattern discovery profiles. The pattern discovery profiles are used to detect a plurality of events in the event database 20, which satisfy the criteria described in the pattern discovery profiles. The events selected for comparison to the criteria defined in the pattern discovery profiles may be based on a range or a category that may be specified by the user or another process. The range for example may include a time range for events, such as the events within the last 5 minutes, or within the last 24 hours. Other filter conditions may be applied to identify the set of events to compare against pattern discovery profiles. The database manager 22 may execute SQL commands to compare event data from the event database 20 to the criteria defined in the pattern discovery profiles. The notifier 24 may generate notifications (e.g., messages, alerts, etc., if a pattern is detected. Also, event data for detected patterns may be displayed and analyzed. The rules engine 18 may include rules for invoking pattern detection via the database manager 22, such as rules describing when to conduct pattern detection or who can view pattern detection results. The pattern discovery module 30 may include a field selection module 31 to select fields for a pattern discovery profile and a pattern identifier engine 32 for detecting patterns that satisfy the criteria of a pattern discovery profile. The field selection module 31 and the pattern identifier engine 32 are described in further detail with respect to FIG. 2.

Figure 2:
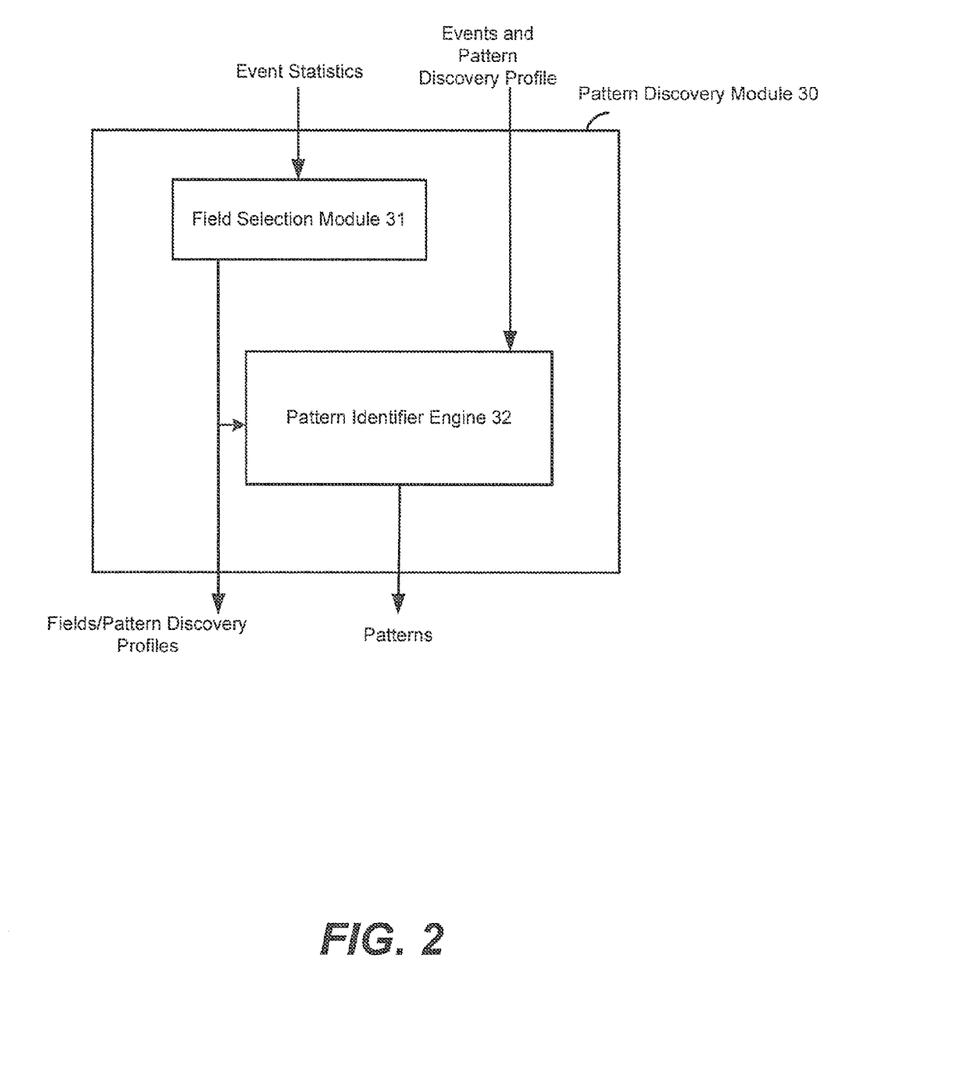
FIG. 2 shows a pattern discovery module.

FIG. 2 shows the pattern discovery module 30 including the field selection module 31 and the pattern identifier engine 32. The field selection module 31 analyzes event statistics to select fields for pattern discovery profiles. The event statistics may include the cardinality and repetitiveness for various fields in the database. Cardinality is the number of unique items in a set. Fields with a higher cardinality may become the transaction field for binding transactions comprised of a sequence of activities.

Repetitiveness is the number of times a value in a field is repeated. A field with high cardinality may help achieve high repetitiveness. For example, assume there are only two computer systems in a network, and only these computer systems are reporting activity as events. There are only two IP address, so if the source IP address or the target IP address are selected as the transaction fields, there is not much repetitive behavior. However, if there are ten different sets of computer systems, then more repetitiveness for a sequence of activities may be detected because there are many more combinations of source and target IP addresses that can exhibit the sequence of activities.

The pattern identifier engine 32 compares events to the criteria defined in pattern discovery profiles to identify patterns matching the pattern discovery profiles. For example, the pattern identifier engine 32 may receive a pattern discovery profile from the field selection module 31 or receive a previously-stored pattern discovery profile from the event database 20. A match may include events representing a sequence of activities that satisfy the criteria defined in the pattern discovery profile. Each instance that matches the pattern discovery profile is a pattern.

Prior to comparing events to a pattern discovery profile, the events may be filtered. For example, events matching predetermined criteria, such as events within a range or in a category, may be received from the event database 20 in response to a query. These events are compared to the criteria defined in the discovery profile to detect matches.

Figure 3:
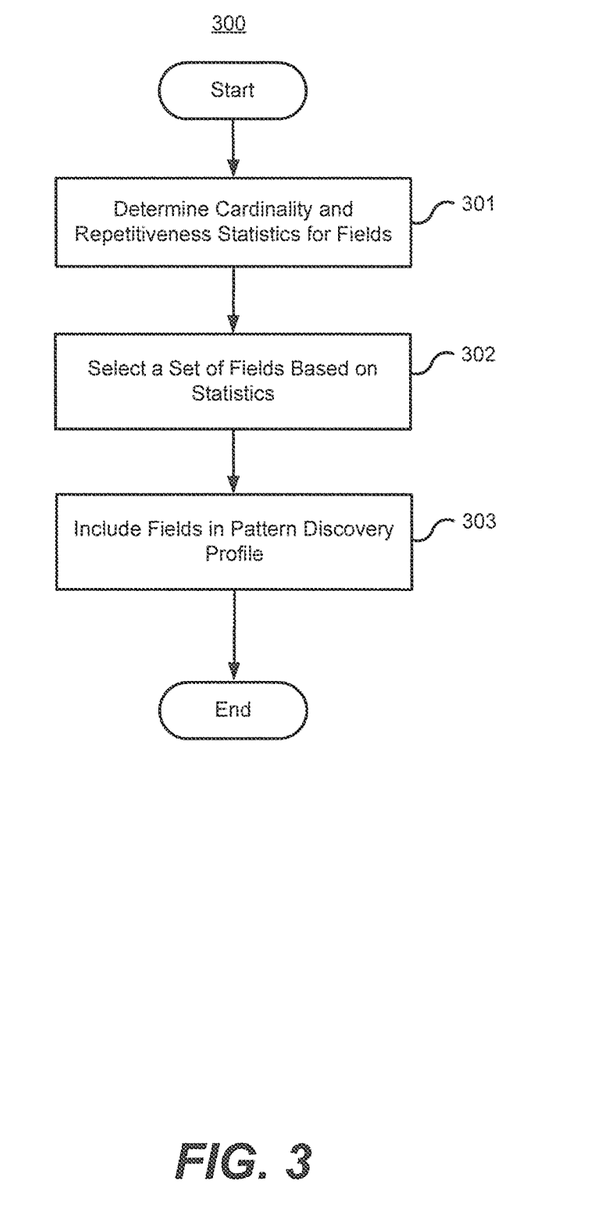
FIG. 3 shows a flow diagram for field selection.

FIG. 3 illustrates an example of a method 300 for determining fields and parameters for pattern matching. The fields may be selected and incorporated into a pattern discovery profile and stored in the event database 20 shown in FIG. 1. The method 300 may be performed by the pattern discovery module 30 or by other modules in systems other than shown in FIG. 1. Also, the method 300 may be carried out by execution of machine readable instructions stored on a data storage device.

At 301, cardinality and repetitiveness statistics are determined for event fields. Event fields include fields describing attributes of the captured event data. The event database 20 may include an event table including the event fields, as described above. The fields may describe the event name, the event category, event times (e.g., when event activity occurred), event date, source and destination IP addresses, etc.

The cardinality of a field is the number of unique items (e.g., values) in the field. The repetitiveness of a field is the number of times a value in the field is repeated. For example, the field may be event name and the repetitiveness of this field determines the number of times each unique event name in the field is repeated. The event name may be describing the activity for the event and the repetitiveness may identify the number of times each activity is repeated. Some fields may have null values and the null values are not included when determining the cardinality and repetitiveness of each field. The cardinality and repetitiveness statistics for a field may be determined by querying the event database 20.

At 302, a set of fields is selected based on the cardinality and repetitiveness statistics determined at 301. For example, fields with high cardinality (e.g., top 5) and high repetitiveness (e.g., same activity performed 100 times within predetermined period) are selected. In another example, fields with low to medium cardinality and high repetitiveness are selected. In one embodiment, a global summary of event data is used to determine thresholds for determining whether a statistic (e.g., cardinality or repetitiveness) is low, medium or high. The global summary contains the histogram of a unique value for each event field. This information is updated with new events coming in and persisted in the database.

From the pattern discovery perspective, the global summary is statistics of the historic data in each field, and the global summary may be used to select fields which are possible candidates for event, source and target fields for pattern discovery. Usually, these fields have at least a few repeated unique values. In one example, to discovery such fields from the global summary, the fields are ordered according to the frequency of their unique values. Then, the top-k high frequency unique values are determined for each field (or for the top fields in the order) and the ratio of the sum of the number of events with any of these top-k values over the total number of all events is computed. A higher ratio indicates the field is more concentrated on a few top unique values. This field is more likely to repeat itself and thus is a good candidate for event/source/target field.

Formally, for each $field_i$, which has n unique values, we compute $$\text{Ratio}(field_i) = \frac{\sum_{j \in top\,k} \text{event number}(value_j)}{\sum_{j=1}^{n} \text{event number}(value_j)}$$

Then the fields which have high ratio values (e.g., top x number of fields) may be selected as the source/target/event (pattern identification) fields.

The above equation can be applied to all the event fields or a small set of event fields to reduce the search space. This small set of event fields may be determined from a list which can be modifiable by a user.

At 303, the selected fields are included in a pattern discovery profile. Multiple pattern discovery profiles may be created and stored in the event database 20 according to the method 300. A pattern discovery profile may include parameter values. Examples of parameters may include the number of activities in a sequence, the number of times a sequence of activities is repeated, time range of events to be evaluated, etc. The parameter values may be selected by a user or may be based on pattern matching results.

The pattern discovery profile, which may include the selected fields and parameters, is used to identify a result set of patterns from event data. For example, the determined fields and parameters are included in a pattern discovery profile and the pattern discovery module 30 determines whether there are any matches between event data and the criteria defined in pattern discovery profile. The matches are detected patterns. The detected patterns may be presented to a user via a display and may be further analyzed, for example, to determine whether they are representative of a network security threat.

Figure 4:
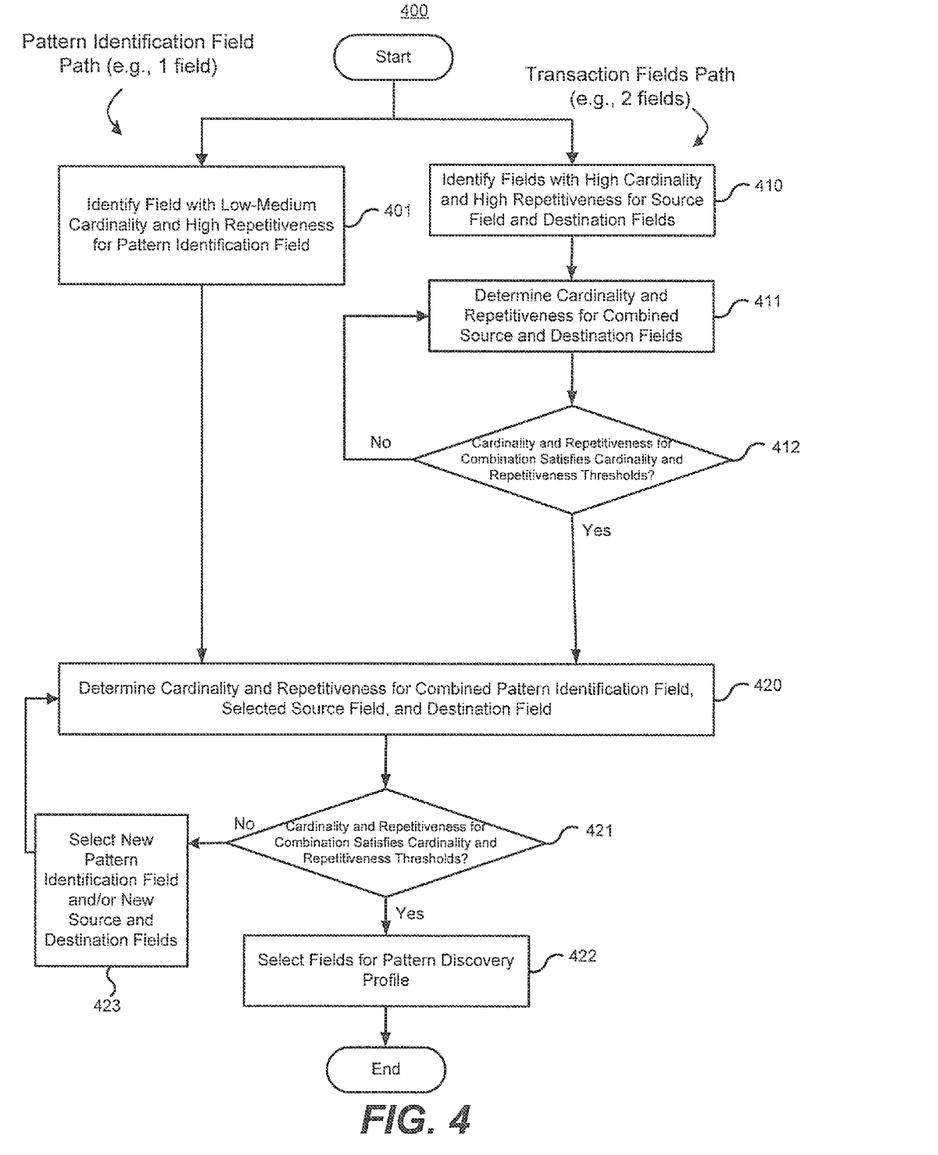
FIG. 4 shows another flow diagram showing additional details for field selection.

FIG. 4 illustrates an example of a method 400 for determining fields for pattern matching. The method 400 may be performed to determine the fields at 302 of the method 300. The fields may be selected and incorporated into a pattern discovery profile and stored in the event database 20 shown in FIG. 1. The method 400 may be performed by the pattern discovery module 30 or by other modules in systems other than shown in FIG. 1. Also, the method 400 may be carried out by execution of machine readable instructions stored on a data storage device.

The method 400 includes two paths. One path identifies a pattern identification field, such as event name, user ID, event category, etc., and the other path identifies transaction fields, such as source and destination fields.

At 401, a field with low to medium cardinality and high repetitiveness are identified for pattern identification fields. In one example, low to medium cardinality may be based on predetermined thresholds or ranges. For example, the cardinality of each of the fields is determined and the fields are sorted by their cardinality from high to low. The top 33% may be considered high cardinality. The remaining is considered medium to low cardinality. In an example, the repetitiveness of fields is determined and the fields are sorted by their repetitiveness. The top 40% may be considered high cardinality and the remaining are considered medium to low repetitiveness. The thresholds may be adapted over time based on various factors. One of the fields with low to medium cardinality and high repetitiveness is selected as the pattern identification field. In one example, the selected field may be the field with the highest repetitiveness and medium cardinality.

At 410-412, fields are selected for source and destination fields. At 410, fields with high cardinality and high repetitiveness are identified. As described with respect to 401, the thresholds or ranges for low, medium and high cardinality and repetitiveness may be predetermined and adapted over time. A pair of fields from the fields having high cardinality and high repetitiveness is selected.

At 411, field cardinality and repetitiveness are determined for the combination of the fields selected 410. For example, two fields are selected, one as a source and one as destination, from the fields identified at 410. The combined cardinality and repetitiveness for those two fields together is determined. The combined cardinality may be determined by considering the combined field value as a vector consisting of multiple dimensions (1 dimension per field). Two such vectors are considered identical if all the dimensions match exactly, if 1 or more dimensions differ, then the vectors are distinct. For example, assume that source IP address has a cardinality of 1000, and target IP address has a cardinality of 200. Also, assume that the event data set is large (e.g., about 100 million events). Among these events, combined cardinality is determined for the source IP Address and the target IP Address fields anywhere from 1000 [(max(card(source IP Address), card(Target IP address)] to 200,000 [card(source IP Address)*card(Target IP address)]. The exact value depends upon a number of unique combinations of source and target IP Addresses in the population of selected events for pattern discovery.

At 412, the cardinality and repetitiveness for the combination are compared to cardinality and repetitiveness combination thresholds to determine if the combination has high cardinality and high repetitiveness. The thresholds for determining whether the high cardinality and high repetitiveness for the combination are high may be predetermined and adapted over time. The examples of cardinality and repetitive thresholds can be 50,000 and 100 respectively. These values can also be configured by the user.

If the combination of selected fields does not satisfy the thresholds (e.g., the high cardinality and repetitiveness are not high), then another combination of fields are selected at 411 from the set of fields identified at 410, and the comparison is repeated at 412. This process is repeated until a source field and a destination field from the fields determined at 410 are identified that have a cardinality and repetitiveness for the combination that satisfy the thresholds at 412 (e.g., high cardinality and high repetitiveness for the combination). If no combination of fields from the fields determined at 410 can be identified that satisfy the thresholds, then the method 400 ends or a new set of fields may be determined at 410 for example by reducing the cardinality and repetitiveness requirements.

At 420, the cardinality and the repetitiveness of the combination of the pattern identification field identified at 410 and the source and destination fields selected at 412 are determined, and compared to thresholds at 421. If the cardinality and the repetitiveness of the combination do not satisfy the thresholds, then a new combination is selected at 423. For example, at 423, a new pattern identification field is selected that has low to medium cardinality and high repetitiveness, such as determined at 401, and/or a new combination of source and destination fields are selected that satisfy thresholds for the combination, such as determined at 410-412. Then, the new combination of pattern identification field identified and the source and destination fields is compared to the thresholds at 421.

At 422, if the cardinality and the repetitiveness of the combination of the pattern identification field and the source and destination fields satisfy the thresholds, as determined at 421, then the pattern identification field and the source and destination fields may be included in a pattern discovery profile for detecting patterns from event data.

Figure 5:
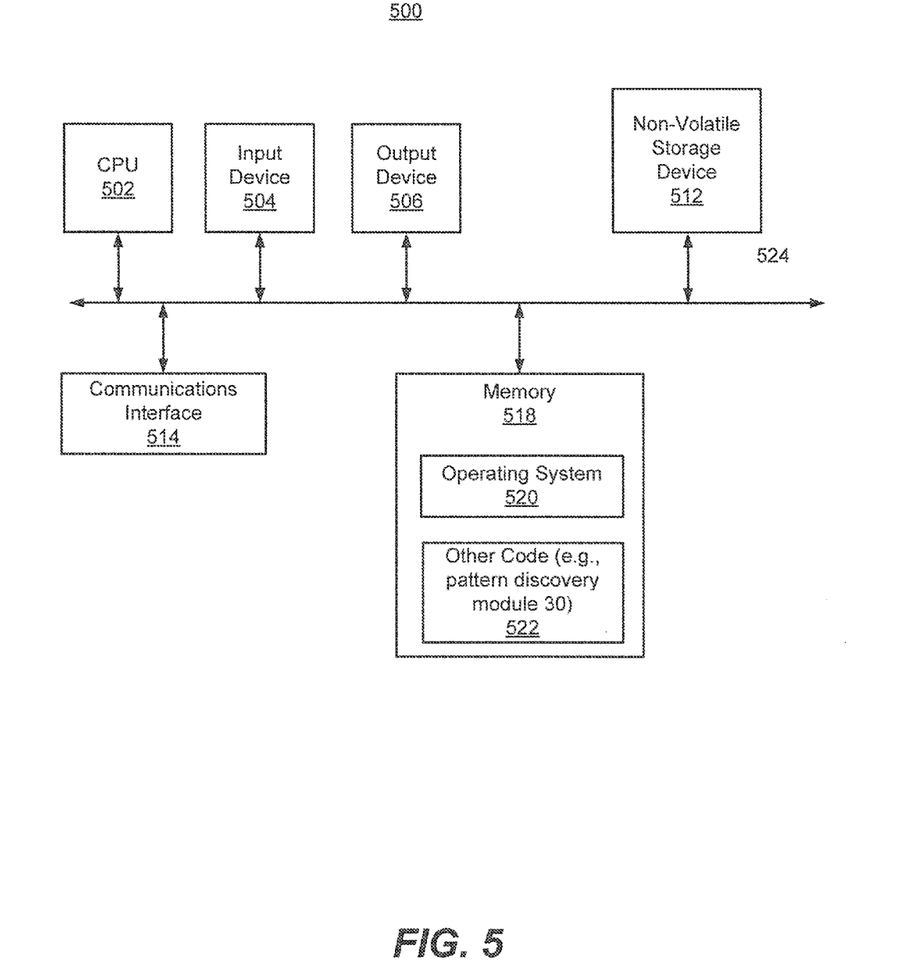
FIG. 5 illustrates a computer system in which embodiments may be implemented.

FIG. 5 illustrates a computer system in which an embodiment may be implemented. The computer system 500 may be a platform for the system 100 shown in FIG. 1 or one or more of the components of the system 100. The computer system 500 is shown comprising hardware elements that may be electrically coupled via a bus 524. The hardware elements may include a processor, such as central processing unit (CPU) 502, an input device 504, and an output device 506. The computer system 500 may also include storage devices, such as memory 518 and non-volatile storage device 512 (e.g., hard disks, optical disk, solid state storage, etc.). The storage devices are examples of non-transitory computer readable media that may store machine readable instructions. For example, at runtime, the memory 518 may store an operating system 520 and other code 522. The other code 522 may include modules from the system 100 shown in FIG. 1, such as the pattern discovery module 30. The non-volatile storage device 512 may store data and machine readable instructions. The computer system 500 may additionally include a communications interface 514 (e.g., a modem, a network card (wireless or wired), an infra-red communication device, etc.).

It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

While the embodiments have been described with reference to examples, various modifications to the described embodiments may be made without departing from the scope of the embodiments.

What is claimed is:

1. A method for determining fields for a pattern discovery profile, the method comprising:
   receiving, by a computing device comprising a hardware processor that implements machine readable instructions, a stream of event data;
   determining a threshold cardinality and a threshold repetitiveness for each of a plurality of fields of the event data, based on a global summary of the event data;
   determining cardinality and repetitiveness for each of the plurality of fields of the event data;
   selecting, by the computing device, a set of fields among the plurality of fields based on the determined cardinality, the determined repetitiveness, the determined threshold cardinality, and the determined threshold repetitiveness;
   including the set of fields in a pattern discovery profile; and
   detecting malicious activity in the event data using the pattern discovery profile,
   wherein selecting the set of fields comprises selecting a pattern identification field and a plurality of transaction fields based on the determined cardinality and repetitiveness, and
   wherein selecting the plurality of transaction fields comprises selecting, from the plurality of fields, a source field and a destination field having a combined cardinality and repetitiveness that satisfy the threshold cardinality and the threshold repetitiveness.

2. The method of claim 1, wherein selecting the pattern identification field and the plurality of transaction fields comprises:
   determining cardinality and repetitiveness for a combination of the pattern identification field and the plurality of transaction fields.

3. The method of claim 2, comprising:
   selecting a different pattern identification field or a different plurality of transaction fields to be used in the pattern discovery profile, in response to a determination that the combination of the pattern identification field and the plurality of transaction fields do not satisfy the threshold cardinality and the threshold repetitiveness.

4. The method of claim 1, comprising:
   selecting a new source field or a new destination field to be included in the transaction fields, in response to a determination that the combination of the source field and the destination field have a combined cardinality and repetitiveness that satisfy the threshold cardinality and the threshold repetitiveness.

5. The method of claim 1, wherein:
   selecting the pattern identification field includes identifying activities performed in the event data; and
   selecting the plurality of transaction fields includes identifying computer systems performing the activities.

6. The method of claim 1, comprising:
   identifying patterns in the event data matching the pattern discovery profile.

7. The method of claim 6, wherein identifying patterns in the event data matching the pattern discovery profile comprises:
   selecting a subset of the event data in a time range; and
   identifying the patterns in the subset of the event data matching the pattern discovery profile.

8. A network security event processing system comprising:
   data storage storing events describing activities for devices connected to a network, wherein the data storage includes a table storing the events and the table includes fields describing attributes of the events;
   a pattern identifier engine, executed by a hardware processor, to determine a threshold cardinality and a threshold repetitiveness for each of the fields based on a global summary of the events;
   a field selection engine, executed by the hardware processor, to select a set of the fields for pattern discovery based on cardinality and repetitiveness for the fields, the threshold cardinality, and the threshold repetitiveness,
   wherein the set of fields comprise a pattern identification field and transaction fields,
   wherein the field selection engine is to select transaction fields by selecting, from the fields, a source field and a destination field having a combined cardinality and repetitiveness that satisfies the threshold cardinality and the threshold repetitiveness,
   wherein the pattern identifier engine, executed by the hardware processor, is to select the pattern identification field and the transaction fields from the fields based on the determined cardinality and the determined repetitiveness, and
   the pattern identifier engine to:
      detect patterns in the event data based on the selected set of fields; and
      detect malicious activity in the network based on the detected patterns.

9. The network security event processing system of claim 8, wherein each individual pattern identification field identifies one of the activities and each individual transaction field identifies a computer system that performs the activity.

10. A non-transitory computer readable medium including machine readable instructions that when executed by a processor cause the processor to:
   determine a threshold cardinality and a threshold repetitiveness for each of a plurality of fields of event data in a network, based on a global summary of the event data;
   determine cardinality and repetitiveness for each of the plurality of fields of event data;
   select a pattern identification field and transaction fields from the fields based on the determined cardinality for the fields, the determined repetitiveness for the fields, the determined threshold cardinality, and the determined threshold repetitiveness, wherein to select the transaction fields comprises selecting the source field and the destination field to be the transaction fields, in response to a determination that the cardinality and repetitiveness for the combination of the source field and the destination field satisfy the threshold cardinality and the threshold repetitiveness;
   include the set of the fields in a pattern discovery profile, wherein the pattern discovery profile includes criteria associated with the pattern identification field and the transaction fields for identifying a pattern in the event data; and
   detect malicious activity in the network using the pattern discovery profile.

11. The method of claim 2, wherein selecting the pattern identification field and the plurality of transaction fields comprises:
   determining whether the cardinality and repetitiveness for the combination of the pattern identification field and the plurality of transaction fields satisfy the threshold cardinality and the threshold repetitiveness.

12. The method of claim 2, wherein selecting the pattern identification field and the plurality of transaction fields comprises:
   selecting the pattern identification field and the plurality of transaction fields as the set of fields to include in the pattern discovery profile, in response to a determination that the cardinality and repetitiveness for the combination satisfy the threshold cardinality and the threshold repetitiveness.

13. The method of claim 1, wherein selecting the plurality of transaction fields comprises:
   determining cardinality and repetitiveness for a combination of the source field and the destination field.

14. The network security event processing system of claim 8, wherein the global summary of the events includes a plurality of statistics of historic data for each of the fields.

\* \* \* \* \*